United States Patent [19]

Kanegae

[11] 4,238,924
[45] Dec. 16, 1980

[54] CONTROL SYSTEM

[75] Inventor: Hidetoshi Kanegae, Yokohama, Japan

[73] Assignee: Nissan Motor Company, Limited, Yokohama, Japan

[21] Appl. No.: 948,344

[22] Filed: Oct. 4, 1978

[30] Foreign Application Priority Data

Dec. 23, 1977 [JP] Japan .............................. 52-156055

[51] Int. Cl.³ .............................................. F02C 9/04
[52] U.S. Cl. .............................................. 60/39.28 R
[58] Field of Search .................... 60/39.28 P, 39.28 R; 290/40 A, 40 B, 40 C, 40 R

[56] References Cited

U.S. PATENT DOCUMENTS

| | | | |
|---|---|---|---|
| 3,600,888 | 8/1971 | Nethken et al. | 60/39.28 P |
| 3,609,384 | 9/1971 | Strohmeyer | 290/40 R |
| 3,832,846 | 9/1974 | Leeson | 60/39.28 R |
| 3,969,890 | 7/1976 | Nelson | 60/39.28 P |
| 4,146,270 | 3/1979 | Nurnberger et al. | 290/40 R |

*Primary Examiner*—Robert E. Garrett
*Attorney, Agent, or Firm*—Schwartz, Jeffery, Schwaab, Mack, Blumenthal & Koch

[57] ABSTRACT

An output control system for a gas turbine, comprising a fuel flow control valve provided in the fuel supply circuit of the gas turbine for continuously regulating the flow rate of the fuel to be supplied to the combustor of the turbine, and a control circuit for operating the valve to enable the gas turbine to produce a constant output speed, the control circuit including a proportional-plus-integral action network for producing a signal variable with the output speed of the gas turbine, load-change detecting means responsive to an abrupt change in the amount of load on the gas turbine for producing a signal representative of such a change, and an integrator output modifier responsive to the signal from the load-change detecting means for modifying the output signal from the integrator in the proportional-plus-integral action network in such a manner that the delay in the response of the integrator to an input signal is eliminated or at least reduced to a minimum.

17 Claims, 23 Drawing Figures

CONTROL SYSTEM

FIELD OF THE INVENTION

The present invention relates to gas turbine for use as driving sources for power generators or other industrial equipment or as prime movers in various power-driven vehicles such as ships, aircraft and land vehicles. More specifically, the present invention is concerned with an output control system for controlling the power output of a gas turbine in accordance with the amount of load applied to the gas turbine.

BACKGROUND OF THE INVENTION

A gas turbine having in its simplest form a compressor, a compressor driving turbine, an output turbine and a fuel combustor is provided with a fuel supply circuit through which fuel is fed to the fuel combustor through a fuel injection valve projecting into the combustor. The flow rate of the fuel to be supplied from the fuel supply circuit to the fuel combustor of the gas turbine is continuously controlled by means of a fuel flow control valve provided in the fuel supply circuit. Throughout the operation of the gas turbine, the fuel flow control valve is controlled to continuously vary the flow rate of the fuel therethrough so as to enable the gas turbine to produce a constant output speed optimum for the amount of load applied to the gas turbine directly or through any equipment driven by the gas turbine. Thus, the gas turbine is further provided with an output control system for regulating the opening degree of the fuel flow control valve through detection of the output speed of the gas turbine. The detected output speed of the gas turbine is compared with a desired turbine output speed optimum for the amount of load being applied to the gas turbine and a signal is produced which is variable with the difference between the detected and desired output speeds of the gas turbine. Such a signal is fed to a proportional-plus-integral action circuit including a parallel combination of a proportional amplifier and an integrator having a predetermined time constant. The proportional-plus-integral action circuit is thus operative to produce an analog output signal which varies with the time integral of the difference between the detected and desired output speeds of the turbine. The signal delivered from the proportional-plus-integral action circuit is fed to the fuel flow control valve and control the valve in such a manner that the detected output speed of the gas turbine constantly converges toward the desired turbine output speed.

The integrator thus incorporated into an output control system of the above described nature is effective to eliminate the offset involved in the output signal delivered from the proportional amplifier connected n parallel with the integrator. The response of the integrator to an input signal can be improved by increasing the time constant of the integrator but, as the time constant of the integrator is increased, the quality of control by the output signal of the proportional-plus-integral action circuit deteriorates, as is well known in the art. The time constant of the integrator used in a proportional-plus-integral action circuit is, therefore, selected with a view to providing an acceptable compromise between the conflicting requirements for the quality of control and the quality of responsiveness.

Though the time constant of the integrator forming part of a proportional-plus-integral action circuit is selected to provide such a compromise, a problem is encountered in a proportional-plus-integral action circuit used in a control system for a gas turbine in that the fuel flow control valve provided in the fuel supply circuit for the gas turbine cannot promptly respond to an abrupt change in the amount of load on the gas turbine due to the delay involved in the response of the integrator to the variation in the signal applied to the integrator and the delay involved in the response of the fuel flow control valve to the signal applied to the valve. Due to the delayed response of the fuel flow control valve to abrupt variation in the amount of load on the gas turbine, the output speed of the gas turbine tends to fluctuate during a transient period of time subsequent to the abrupt change in the amount of load. If this takes place in a gas turbine used as a driving source for an electric power generator, the power generator is disabled to produce a current with a rated frequency for a certain period of time after the amount of load on the gas turbine has changed.

The delay involved in the response of the fuel flow control valve to the control signal applied thereto can be practically eliminated by provision of a fuel return valve arranged in series with the fuel flow control valve for reducing the flow rate of the fuel to be supplied to the combustor of the gas turbine in response to an abrupt decrease in the amount of load on the gas turbine or by means of a bypass valve arranged in shunt across the fuel flow control valve for permitting fuel to be fed to the combustor of the gas turbine by way of the bypass valve as well as the fuel flow control valve for some time after the amount of load on the gas turbine has changed. Provision of a fuel return or bypass valve in addition to the fuel flow control valve in a fuel supply circuit for a gas turbine is thus useful for maintaining the output speed of the gas turbine substantially unchanged for the transient period of time after the amount of load on the gas turbine is changed. When the fuel return or bypass valve closes at a certain time interval subsequent to the change in the amount of load on the gas turbine, however, the delay in the response of the integrator in the control circuit of the gas turbine comes into effect on the flow rate of the fuel to be supplied to the combustor of the gas turbine and in the result causes the output speed of the gas turbine to fluctuate.

An object of the present invention is to provide an improved turbine output control system in which the delay in the response of the integrator forming part of the control system is eliminated or at least reduced to a minimum by reducing the time constant of the integrator or superposing an additional input signal to the integrator during a transient period of time subsequent to the occurrence of an abrupt change in the amount of load on the gas turbine.

SUMMARY OF THE INVENTION

In accordance with the present invention, there is provided an output control system for a gas turbine having a fuel combustor and a fuel supply circuit for the fuel combustor, comprising a fuel flow control valve provided in the fuel supply circuit and operable for continuously varying the flow rate of fuel therethrough; turbine output detecting means responsive to the variation in the output speed of the gas turbine for producing an output signal variable with the detected turbine output speed; turbine output preset means for producing a signal representative of a desired output speed of the gas turbine; a function generating circuit connected to the turbine output detecting means and the turbine output preset means and including a subtractor operative to produce an output signal which is continuously variable in magnitude with the difference between the detected and desired turbine output speeds which are respectively represented by the signals from the turbine output detecting and preset means, and an integrator connected to the subtractor and operative to produce an analog output signal representative of the time integral of the aforesaid difference represented by the output signal from the subtractor, the above-mentioned function generating circuit being operative to produce an analog output signal which is continuously variable in magnitude with the output signal from the integrator; valve actuating means electrically connected between the function generating circuit and the aforesaid fuel flow control valve for continuously varying the opening degree of the fuel flow control valve in accordance with the analog output signal from the function generating circuit; load-change detecting means responsive to the variation in the amount of load on the gas turbine and operative to produce an output signal having a limited time duration in response to an abrupt change in the amount of load on the gas turbine; and integrator output modifying means connected between the load-change detecting means and the integrator of the function generating circuit and operative to modify the output signal of the integrator to vary at an increased rate at least for a period of time corresponding to the duration of the output signal from the load-change detecting means.

The output control system may further comprise open-degree detecting means for detecting the opening degree of the fuel flow control valve and producing an analog output signal which is continuously variable in magnitude with the detected valve opening degree. In this instance, the above-mentioned valve actuating means is so arranged as to be responsive to the output signal from the function generating circuit and the output signal from the open-degree detecting means for producing an analog signal which is continuously variable in magnitude with the difference in magnitude between the respective output signals from the function generating circuit and the open-degree detecting means, wherein the valve actuating means is constantly operative to actuate the fuel flow control valve for continuously varying the opening degree of the valve so that the output signal from the open-degree detecting means constantly converges toward the output signal from the function generating circuit. In the output control system thus arranged, the load-change detecting means may comprise a comparator having an input terminal connected to the valve actuating means for being supplied with the aforesaid signal produced by the valve actuating means and an input terminal connected to a reference signal generator for constantly delivering a reference signal representative of a predetermined value. The load-change detecting means thus arranged is constructed to be operative to produce the output signal thereof as being representative of an abrupt change in the amount of load on the gas turbine when the signal from the valve actuating means is in a predetermined relationship in magnitude to the above-mentioned reference signal. In this instance, the aforesaid integrator output modifying means has an input terminal connected to the output terminal of the above-mentioned comparator and is operative to modify the output signal of the integrator of the function generating circuit in response to the output signal from the comparator.

As an alternative, the load-change detecting means may comprise load detecting means for detecting the amount of load on the gas turbine and producing an analog output signal continuously variable in magnitude with the detected amount of load, a differentiator having an input terminal connected to the load detecting means and operative to produce an analog output signal representative of the time derivative of the detected amount of load represented by the output signal from the load detecting means, and a comparator having an input terminal connected to the output terminal of the differentiator and an input terminal connected to a reference signal generator for constantly delivering a reference signal representative of a predetermined rate of change of the amount of load on the gas turbine, the comparator being operative to produce an output signal as being representative of an abrupt change in the amount of load on the gas turbine when the signal delivered from the differentiator to the comparator is in a predetermined relationship in magnitude to the reference signal. The load-change detecting means thus constructed and arranged may further comprise pulse generating means connected between the comparator and the integrator of the function generating circuit and operative to produce a pulse having a predetermined time duration as the aforesaid output signal of the load-change detecting means in response to the output signal from the comparator.

The integrator output modifying means in the turbine output control system according to the present invention may comprise a source of a bias signal having a predetermined magnitude and connected to the integrator of the function generating circuit across a switching unit having a control element connected to the load-change detecting means, the switching unit being closed in the presence of the output signal of the load-change detecting means at the control element for superposing the bias signal on the signal to be delivered to the integrator from the subtractor forming part of the function generating circuit.

In one embodiment of the present invention, the load-change detecting means comprises load detecting means for detecting the amount of load on the gas turbine and producing an analog output signal continuously variable in magnitude with the detected amount of load on the gas turbine, and a differentiator which has an input terminal connected to the load detecting means and which is operative to produce an analog output signal representative of the time derivative of the detected amount of load represented by the output signal from the load detecting means, wherein the integrator output modifying means comprises a signal inverter connected between the above-mentioned differentiator and the integrator of the function generating circuit and operative to invert the waveform of the output signal from the differentiator and deliver the resultant output signal to the integrator for superposing the aforesaid resultant output signal on the signal to be delivered to the integrator from the subtractor of the function generating circuit.

By preference, the turbine output control system thus constructed and arranged may further comprise a two-position valve provided in the aforesaid fuel supply circuit of the gas turbine and having open and closed conditions. In this instance, the load-change detecting means of the control system has an output terminal electrically connected to the two-position valve for actuating the two-position valve to open in response to the output signal from the load-change detecting means and for a period of time corresponding to the aforesaid limited time duration.

DESCRIPTION OF THE DRAWINGS

The features and advantages of the turbine output control system according to the present invention will be more clearly appreciated from the following description taken in conjunction with the accompanying drawings in which like reference numerals and characters designate corresponding or similar elements, members, units or signals and in which.

DESCRIPTION OF THE PREFERRED EMBODIMENTS

In the description to follow, it will be assumed that the turbine output control system embodying the present invention has incorporated therein both a fuel flow control valve which is operative throughout the operation of the control system and a fuel return or bypass valve which is operative only upon abrupt variation in the amount of load on the gas turbine. This, however, is solely for the purpose of illustration of the present invention and, thus, the turbine output control system according to the present invention is operable with a fuel flow control valve alone, although it will be preferable to use a fuel return or bypass valve in combination with the fuel flow control valve.

Figure 1:
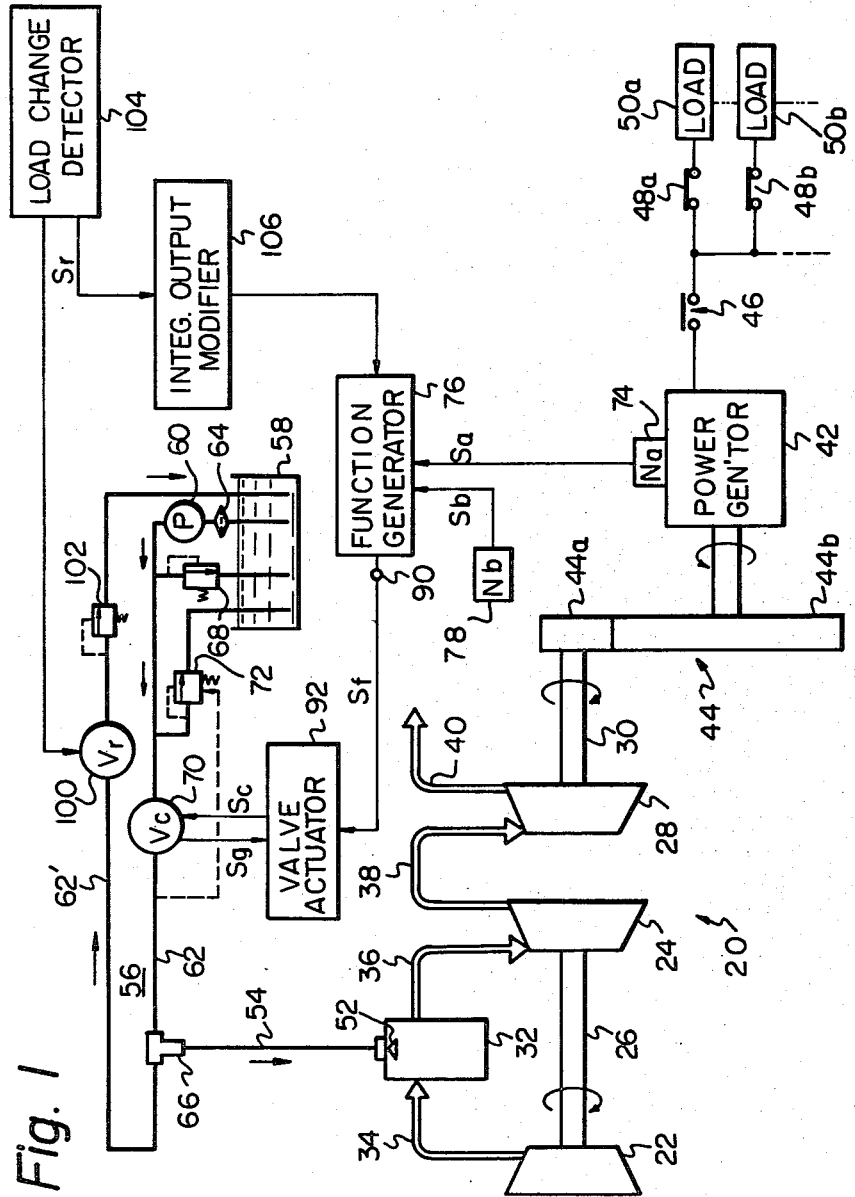
FIG. 1 is a schematic view showing a preferred embodiment of the turbine output control system according to the present invention.

Referring first to FIG. 1 of the drawings, a gas turbine 20 to which a turbine output control system embodying the present invention is to be applied is assumed to be of a series-flow two-shaft type by way of example and is schematically illustrated to comprise a compressor 22, a compressor driving turbine 24 connected to the compressor 22 by a compressor shaft 26, an output turbine 28 mounted on an output shaft 30 arranged in line with but separate from the compressor shaft 26, and a combustor 32 arranged to intervene, in effect, between the compressor 22 and the compressor driving turbine 24. The combustor 32 has an air intake port communicating with the compressor 22 through a compressed air supply passageway 34 and a discharge port communicating with the compressor driving turbine 24 through a combustion gas discharge passageway 36. Between the compressor driving turbine 24 and the output turbine 28 is provided an intermediate combustion gas feed passageway 38 through which the compressor driving turbine 24 is in constant communication with the output turbine 28. An exhaust gas passageway 40 leads from the output turbine 28 and is open to the air at its leading end. The output shaft 30 of the turbine 20 thus constructed and arranged is operatively connected to the drive shaft of a power generator 42 through a reduction gear assembly 44 which is shown consisting of a gear 44a secured to the output shat 30 of the turbine 20 and a gear 44b in mesh with the gear 44a and secured to the input shaft of the power generator 42. The power generator 42 has an output terminal connected across a cricuit breaker 46 and switches 48a, 48b, . . . to loads 50a, 50b, . . . which are arranged in parallel.

The combustor 32 has incorporated therein a fuel injection valve 52 which is located at the leading end of a fuel discharge passageway 54 leading from a fuel supply circuit 56. The fuel supply circuit 56 is shown comprising a fuel storage tank 58, a fuel feed pump 60 having a discharge port communicating with a fuel feed passageway 62 and a suction port communicating with the fuel storage tank 58 through a fuel strainer 64 which is constituted by a filter screen. The fuel discharge passageway 54 terminating at the fuel injection valve 52 is branched from the above-mentioned fuel feed passageway 62 through a tee-joint 66. The fuel feed passageway 62 is provided with a pressure relief valve 68 for maintaining below a predetermined level the pressure of the fuel delivered from the pump 60 to the fuel feed passageway 62.

In operation, the fuel constantly delivered from the pump 60 to the fuel feed passageway 62 and maintained below the predetermined pressure level by means of the pressure relief valve 68 is passed through the fuel discharge passageway 54 to the fuel injection valve 52 and is admitted into the combustor 32 through the fuel injection valve 52. The fuel thus supplied to the combustor 32 is admixed to the compressed air supplied from the compressor 22 by way of the compressed air supply passageway 34 and the resultant mixture of the fuel and air is combusted to produce hot combustion gases in the combustor 52. The combustion gases are fed through the combustion gas discharge passageway 36 to the compressor driving turbine 24 and are allowed to partially expand in the turbine 24, driving the turbine 24 to rotate with the compressor 22. The hot combustion gases are thereafter fed to the output turbine 28 through the intermediate combustion gas feed passageway 38 and are allowed to finally expand in the output turbine 28, thereby driving the output turbine 28 to rotate with the output shaft 30. The rotation of the output shaft 30 of the gas turbine 20 is transmitted through the reduction gear assembly 44 to the input shaft of the power generator 42. The electric power thus produced by the generator 42 is supplied through the circuit breaker 46 and the switches 48a, 48b, . . . to the loads 50a. 50b, . . . and is consumed in energizing the loads. The exhaust gases produced in the output turbine 28 are discharged to the open air by way of the exhaust gas passageway 40.

The constructions and arrangements of the gas turbine 20 and the electric power system including the turbine-driven power generator 42 as above described are merely by way of example and may therefore be modified or changed in numerous manners if desired. For instance, the compressor 22 of the gas turbine 20 may be replaced with two, low-pressure and hgh-pressure compressors arranged in series on the compressor shaft 26 and having an intercooler provided therebetween so as to cool the compressed air to be passed from the low-pressure compressor to the high-pressure compressor. Furthermore, the intermediate combustion gas feed passageway 38 may be arranged with a reheater unit so as to reheat the combustion gases to be finally expanded in the output turbine 28. As is well known in the art, the additions of an intercooler between the compressors or a reheater unit between the turbines of a gas turbine contribute to enhancement of the power output efficiency of the gas turbine having a given size. For further improvement of the power output efficiency of the gas turbine, the exhaust passageway 40 leading from the output turbine 28 may be passed through a heat exchanger or regenerator arranged to form part of the compressed air supply passageway 34 between the compressor 22 and the combustor 52 so as to pre-heat the compressed air to be supplied to the combustor 52 by the residual heat in the hot exhaust gases to be discharged to the open air through the exhaust gas passageway 40. The compressor driving and output turbines 24 and 28 may be replaced with a single turbine mounted on a shaft connected at one end to the compressor 22 and engaged at the other end by the reduction gear assembly 44.

In the turbine and power generator system thus constructed and arranged, it is important that the power output of the gas turbine 20 be controlled to maintain constant the frequency of the current to be delivered from the power generator 42. For this reason, the gas turbine 20 is provided with a turbine output control system comprising an electrically operated fuel flow control valve 70 arranged in the fuel feed passageway 62 of the fuel supply circuit 56. The fuel control valve 70 is provided between the fuel feed pump 60 and the tee-joint 66 of the fuel supply circuit 56 and is operative to continuously vary the flow rate of the fuel to be passed therethrough in accordance with a control signal Sc which is continuously supplied to the valve 70 from a control circuit responsive to the variation in the power output of the gas turbine 20. The fuel flow control valve 70 is provided with a differential pressure compensating valve 72 which is arranged in shunt with the flow control valve 70 for maintaining constant the difference between the fuel pressures across the flow control valve 70 so that the flow rate of the fuel through the flow control valve 70 varies accurately in proportion to the degree of opening of the valve 70 without respect to the fluctuations, if any, in the pressure of the fuel delivered from the fuel feed pump 60.

The frequency of the electric current to be produced by the power generator 42 varies with the revolution speed of the output shaft 30 of the gas turbine 30. If it is desired that the current to be delivered from the power generator 42 have a rated frequency of 50 hertz for example, the output shaft 30 of the gas turbine 20 must be driven for rotation at a constant velocity of, for example, 25000 rpm. The revolution speed of the output shaft 30 of the gas turbine 20 and accordingly the revolution speed of the input shaft of the power generator 42 change if and when there is caused a change in the amount of load on the power generator 42 provided the power output of the gas turbine 20 is kept unchanged. If there is caused a change in the amount of load on the power generator 42 and accordingly in the amount of load on the gas turbine 20, the revolution speed of the power generator input shaft and accordingly the revolution speed of the turbine output shaft 30 change.

Thus, the turbine output control system according to the present invention further comprises turbine output speed detecting means which is constituted in the embodiment shown in FIG. 1 by a generator input speed detector 74 which is arranged in association with the power generator 42. The generator input speed detector 74 is adapted to detect the revolution speed Na of the input shaft of the power generator 42 and produce an output signal Sa which varies in magnitude with the detected revolution speed Na of the power generator input shaft. Such a detector 74 may be constituted by a tachometer generator mechanically coupled to the input shaft of the power generator 42 for producing as the above-mentioned signal Sa a voltage continuously variable with the detected revolution speed Na of the power generator input shaft. As an alternative, the generator input speed detector 74 may be constituted by a magnetic or stroboscopic tachometer having permanent-magnet d.c. generating elements or an apertured rotor disc attached to or otherwise driven by the input shaft of the power generator so as to produce as the above-mentioned signal Sa a train of pulses with a frequency proportional to the detected revolution speed Na of the power generator input shaft. In the description to follow, the generator input detector 74 serving as the above-mentioned turbine output speed detecting means will be assumed, by way of example, to be constituted by a tachometer generator mechanically coupled to the power generator input shaft. Thus, the signal Sa to be produced by the generator input speed detector 74 of the embodiment shown in FIG. 1 is assumed to be an analog signal which is continuously variable with the detected revolution speed Na of the input shaft of the power generator 42. It is apparent that the revolution speed Na of the power generator input shaft is proportional to the revolution speed of the output shaft 30 of the gas turbine 20 so that the analog output signal Sa from the generator input speed detector 74 is also representative of the revolution speed of the output shaft 30 of the gas turbine 20.

The generator input speed detector 74 is electrically connected to a function generator 76 forming part of the above-mentioned control circuit and constantly supplies the analog signal Sa to the function generator 76. The function generator 76 is further connected to manually adjustable turbine output speed or generator input speed preset means 78 adapted to produce a signal Sb which is representative of a desired revolution speed Nb of the input shaft of the power generator 42 and accordingly of a desired revolution speed of the turbine output shaft 30.

Figure 2:
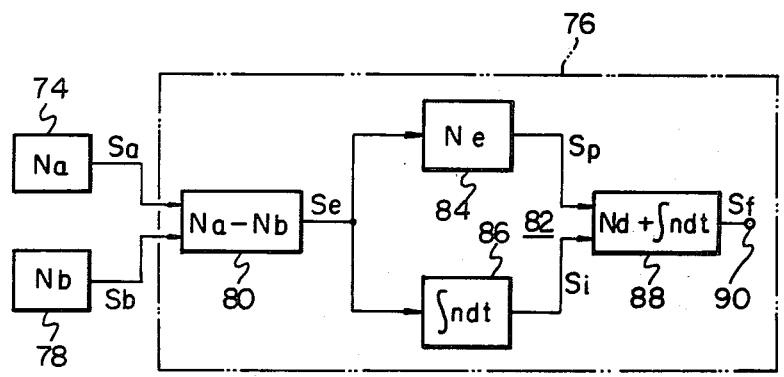
FIG. 2 is a block diagram showing a function generating circuit forming part of the turbine output control system illustrated in FIG. 1.
Figure 3:
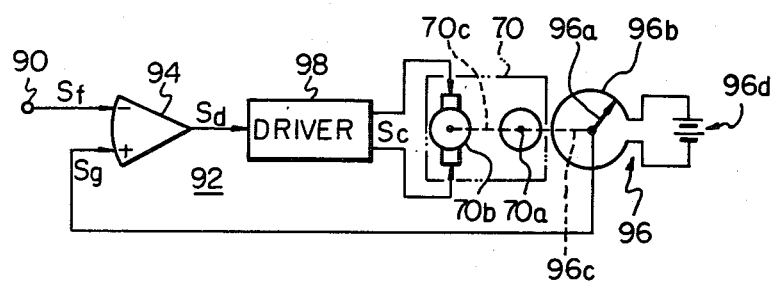
FIG. 3 is a schematic view showing an example of valve actuating means also forming part of the turbine output control system illustrated in FIG. 1.

As illustrated schematically in FIG. 2, the function generator 76 comprises a subtractor 80 having two input terminals connected to the above described generator input speed detector 74 and generator input speed preset means 78, respectively. The subtractor 80 is thus constantly supplied with the signals Sa and Sb from the generator input speed detector and preset means 74 and 78 and is operative to produce an analog error signal Se which is representative of the difference Na−Nb between the detected and desired revolution speeds Na and Nb of the input shaft of the power generator 42. The subtractor 80 has an output terminal connected to a proportional-plus-integral action network 82 consisting of a proportional or linear amplifier 84 and an integrator 86 which have respective input terminals connected in parallel with the output terminal of the subtractor 80, and an adder 88 having input terminals connected to the respective output terminals of the proportional amplifier 84 and the integrator 86. The proportional amplifier 84 is adapted to produce an output signal Sp representative of a linearly amplified version Ne of the value Na−Nb represented by the error signal Se delivered from the subtractor 80, while the integrator 86 is adapted to produce an output signal Si which is representative of the time integral of the value Na−Nb represented by the signal Se from the subtractor 80. The respective output signals Sp and Si of the proportional amplifier 84 and the integrator 86 are fed to the adder 88 and are thereby combined together to produce at an output terminal 90 of the function generator 76 an analog signal Sf which is continuously variable with the sum of the values respectively represented by the signals Sp and Si supplied to the adder 88. The analog signal Sf thus appearing at the output terminal 90 of the function generator 76 is representative of a desired opening degree of the fuel flow control valve 70. Since the flow rate of the fuel through the fuel flow control valve 70 is constantly proportional to the opening degree of the valve 70 due to the action of the differential pressure compensating valve 72 as previously noted, the signal Sf delivered from the function generator 76 also represents a desired flow rate of the fuel to be passed through the fuel flow control valve 70 to the fuel injection valve 52 in the combustor 32 of the gas turbine 20 (FIG. 1). The output terminal 90 of the function generator 76 is connected to a valve actuator 92 the details of which are illustrated in FIG. 3. In FIG. 3, the fuel flow control valve 70 is shown comprising a movable valve element 70a and an electrically operated servo motor 70b mechanically coupled to the valve element 70a as indicated by a broken line 70c.

As illustrated in FIG. 3, the valve actuator 92 for the fuel flow control valve 70 comprises a differential amplifier 94 having an input terminal connected to the above-mentioned output terminal 90 of the function generator 76 and an input terminal connected to suitable fuel flow detecting means adapted to detect the flow rate of the fuel through the fuel flow control valve 70 and to produce an output signal Sg which is continuously variable in magnitude with the detected fuel flow rate. In FIG. 3, such fuel flow detecting means is shown to be constituted by a potentiometer 96 having a sliding contact 96a mechanically coupled to the movable valve element 70a of the fuel flow control valve 70 as indicated by a broken line 96c and in slidable contact with a resistor element 96b connected across a d.c. power source 96d so as to produce between the power source 96d and the sliding contact 96a a d.c. voltage which is proportional to or otherwise continuously variable with the opening degree of the fuel flow control valve 70 and accordingly with the flow rate of fuel through the control valve 70. The differential amplifier 94 thus supplied with the signals Sf and Sg representative of the desired and detected flow rates of fuel through the fuel flow control valve 70 produces an analog error signal Sd representative of the difference between the fuel flow rates respectively represented by the signals Sf and Sg fed to the differential amplifier 94. The differential amplifier 94 has an output terminal connected through a driver circuit 98 to the servo motor 70b of the fuel flow control valve 70 so that the error signal Sd delivered from the differential amplifier 94 is supplied as the previously mentioned control signal Sc to the servo motor 70b of the control valve 70 through the driver circuit 98. The servo motor 70b of the fuel flow control valve 70 has input terminals with opposite polarities and is mechanically connected to the above-mentioned movable valve element 70a of the control valve 70 as indicated by a broken line 70c. The servo motor 70b is thus operative to move the movable valve element 70a of the control valve 70 through an angle or a distance dictated by the magnitude of the control signal Sc and in a direction dictated by the polarity of the signal Sc until the flow rate of the fuel through the control valve 70 as detected by the potentiometer 96 becomes equal to the desired flow rate represented by the signal Sf supplied to the differential amplifier 94 from the function generator 76 illustrated in FIG. 3.

When, now, any of the switches 48a, 48b, ... is closed or opened up and accordingly any of the loads 50a, 50b, ... is connected to or disconnected from the output terminal of the power generator 42 during operation in which the gas turbine and power generator system has been operated in steady-state conditions, there is caused a change in the amount of load on the power generator 42 so that the input shaft of the power generator 42 and accordingly the output shaft 30 of the gas turbine 20 are caused to rotate at reduced or increased speeds. The change in the revolution speed Na of the power generator input shaft is followed by a change in the magnitude of the analog output signal Sa delivered from the generator input speed detector 74 and further by a change in the output signal Sf delivered from the function generator 76. The change in the magnitude of the signal Sf supplied to one input terminal of the differential amplifier 94 in the valve actuator 92 results in a deviation in magnitude of the signal Sf from the signal Sg supplied to the other input terminal of the differential amplifier 94 and thus causes the servo motor 70b of the fuel flow control valve 70 to move the movable valve element 70a of the valve 70 until the signal Sg representative of the detected flow rate of the fuel through the control valve 70 is brought into agreement in magnitude with the signal Sf representative of the desired fuel flow rate.

When there is caused a sudden change in the amount of load on the gas turbine 20 as above described, the signal Sf representative of the new desired fuel flow rate is delivered from the function generator 76 to the valve actuator 92 immediately in response to the change in the amount of load. Since, however, the fuel flow control valve 70 inherently has a delay involved in the mechanical actions of the servo motor 70b thereof, the movable valve element 70a of the valve 70 is permitted to reach the position producing the new desired fuel flow rate with a certain time lag after the signal Sf is supplied to the valve actuator 92 in response to the change in the amount of load on the gas turbine 20. If this takes place when the amount of load on the gas turbine 20 is reduced, for example, fuel is supplied to the combustor 32 of the gas turbine 20 at a rate higher than the desired fuel flow rate optimum for the reduced amount of load on the gas turbine 20 and causes the output shaft 30 of the gas turbine to overrun the revolution speed required by the power generator 42 for the period of the above-mentioned time lag.

To obviate this problem, the fuel supply circuit 56 shown in FIG. 1 further comprises a fuel return passageway 62′ leading from the tee-joint 66 between the previously described fuel feed and discharge passageways 62 and 54 to the fuel storage tank 58. The fuel return passageway 62′ has provided therein a solenoid-operated two-position fuel return valve 100 operable between open and closed positions and a pressure regulator valve 102 arranged between the fuel return valve 100 and the fuel storage tank 58 for maintaining above a predetermined minimum value the pressure of the fuel to flow between the tee-joint 66 and the pressure regulator valve 102 when the fuel return valve 100 is in the open position. The fuel return valve 100 is assumed to be biased to assume the closed position and to be actuated into the open position when energized and is electrically connected to an output terminal of a load-change detecting circuit 104 which forms part of the control circuit previously mentioned. The load-change detecting circuit 104 is responsive to a sudden change in the amount of load on the gas turbine 20 and is operative to produce an output signal Sr when the amount of load on the gas turbine generator system changes. In the arrangement illustrated in FIG. 1, the load-change detecting circuit 104 is assumed to be adapted to produce the output signal Sr when the amount of load exerted on the gas turbine 20 is suddenly reduced. Such a change in the amount of load on the gas turbine 20 will take place when, for example, one or more of the loads 50a, 50b, . . . are disconnected from the output terminal of the power generator 42 with the associated one or ones of the switches 48a, 48b, . . . opened up during operation.

When the signal Sr is thus supplied to the fuel return valve 100 from the load-change detecting circuit 104, the fuel return valve 100 is energized by the signal Sr and is actuated to open for a certain short period of time (which is dictated by the rate of change of the amount of load on the gas turbine as will be understood as the description proceeds), allowing the fuel in the fuel feed passageway 62 to be partially returned to the fuel storage tank 58 by way of the fuel return passageway 62′. The flow rate of the fuel thus passed through the fuel return passageway 62′ to the tank 58 is limited by means of the pressure regulator valve 102 establishing a fuel pressure higher than the above-mentioned predetermined minimum value in the fuel return passageway 62′ upstream of the regulator valve 102 and accordingly in the fuel discharge passageway 54 communicating with the fuel return passageway 62′ through the tee-joint 66. The pressure regulator valve 102 provided in the fuel return passageway 62′ of the fuel supply circuit 56 thus serves to ensure fuel to be passed through the fuel injection valve 52 into the combustor 32 of the gas turbine 20 against a resistance imparted to the flow of the fuel in the fuel injection valve 52. The minimum fuel pressure to be established in the fuel discharge passageway 54 by the pressure regulator valve 102 is such that fuel can be injected into the combustor 32 of the gas turbine 20 at a rate which will maintain the flame in the combustor 32 without being blown out by the compressed air also injected into the combustor or preferably at a rate which is adequate not only to maintain the flame in the combustor 32 but to enable the gas turbine 20 to continue idling throughout the period of time for which the fuel return valve 100 is held open.

For the purpose of enabling the fuel supply circuit 56 to establish a steady flow of fuel in the fuel return passageway 62′ as early as possible after the fuel return valve 100 has been actuated to open, it is important that the fuel return passageway 62′ be branched substantially straight forward from the fuel feed passageway 62 as shown. Using the tee-joint at the junction between the fuel feed and return passageways 62 and 62′ suits this purpose. If desired, however, the fuel return passageway 62′ may be branched from the fuel discharge passageway 54 or from between the fuel flow control valve 70 and the tee-joint 66, though not shown in the drawings. It is apparent that the pressure regulator valve 102 may be located upstream of fuel return valve 100 or may be substituted by a flow restriction or orifice provided in the fuel return passageway 62′ upstream or downstream of the fuel return valve 100.

Immediately before the fuel return valve 100 is actuated to open upon reduction in the amount of load on the gas turbine, the flow rate of the fuel to be supplied to the combustor 32 of the gas turbine 20 through the fuel discharge passageway 54 and the fuel injection valve 52 stays unchanged for a moment due to a delay which the fuel return valve 100 has involved in responding to the input signal supplied thereto. For this reason, the power output of the gas turbine 20 is kept unchanged and accordingly the output shaft 30 of the gas turbine 20 is caused to overrun the desired revolution speed of the shaft momentarily after the amount of load on the gas turbine has been reduced. In response to such an instantaneous increase in the revolution speed of the turbine output shaft 30, the output signal Sf from the function generator 76 which attempts to reduce the opening degree of the fuel flow control valve 70 in response to the input signal Sa representative of the increased revolution speed of the power generator input shaft decrease abruptly after the fuel return valve 100 is opened up. The output signal Sf delivered from the function generator 76 under these conditions is, however, not reduced in magnitude to such a level as to correspond to a desired valve opening degree to which the fuel flow control valve 70 is to be adjusted to produce in the gas turbine 20 a power output which is optimum for the reduced amount of load on the gas turbine, as will be seen from curve $A_1$ illustrated in FIG. 4A in which the above-mentioned level is indicated by the axis of abscissa. This is because of the fact that, since the integrator 86 forming part of the function generator 76 is designed in such a manner as to have a relatively large time constant with a view to providing stability of control over the flow rate of the fuel to be supplied to the combustor 32 of the gas turbine 20, there is caused retardation in the response of the integrator 86 to the variation in the error signal Se delivered from the subtractor 80 and accordingly in the response of the function generator 76 to the variation in the detected output speed of the turbine as represented by the signal Sa supplied to the function generator 76.

Figure 4A:
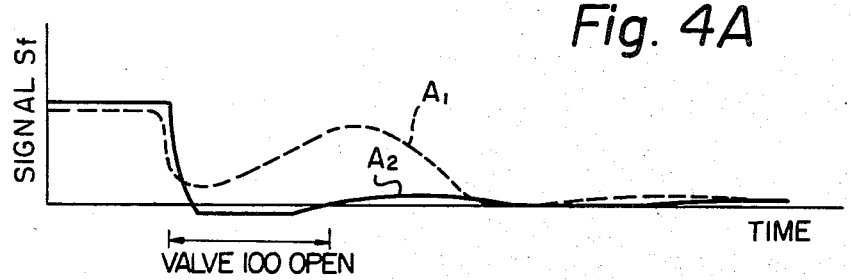
FIGS. 4A to 4C are graphs showing waveforms indicative of some operational characteristics (indicated by curved in broken lines) obtained in a gas turbine and a prior-art turbine output control system and those (indicated by curved in full lines) obtained in a gas turbine and a turbine output control system embodying the present invention.
Figure 4B:
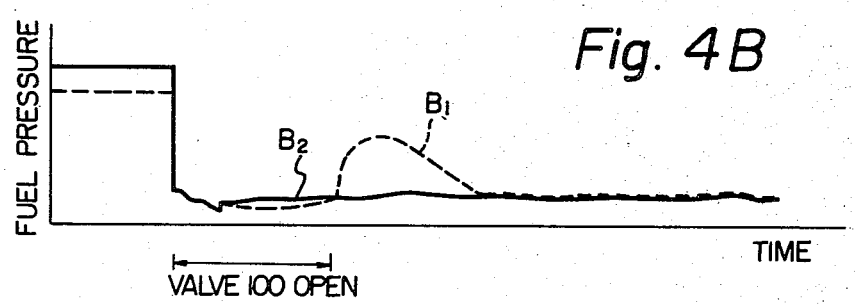

Upon opening of the fuel return valve 100, there is caused a sudden drop in the pressure of the fuel in the fuel discharge passageway 54 as will be seen from FIG. 4B, causing corresponding reduction in the flow rate of the fuel to be supplied to the combustor 32 of the gas turbine 20. The turbine power output which has been momentarily increased as discussed above is therefore reduced with a consequent decrease in the revolution speed of the output shaft 30 of the gas turbine 20. In response to the signal Sa representative of the revolution speed thus reduced, the function generator 76 produces an output signal Sf which is effective to increase the opening degree of the fuel flow control valve 76, as will be seen from curve $A_1$ in FIG. 4A.

Figure 4C:
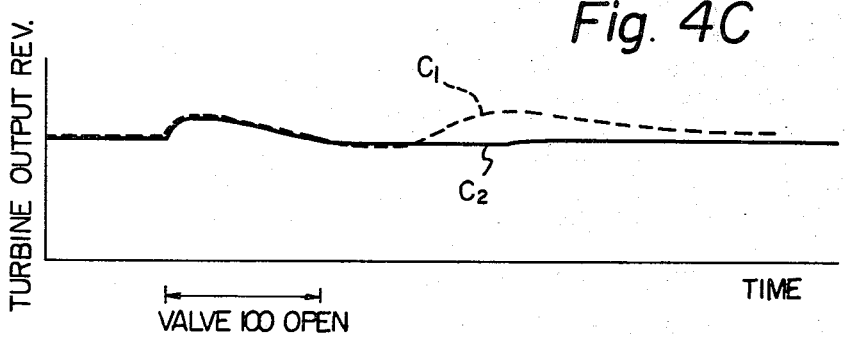

Upon lapse of the signal Sr which has been supplied from the load-change detecting circuit 104, the fuel return valve 100 closes and cuts off the flow of fuel through the fuel return passageway 62'. By the point of time when the fuel return valve 100 is thus closed, the fuel flow control valve 70 has responded to the signal Sf produced by the function generator 76 on the basis of the signal Sa representative of the turbine output speed temporarily increased after opening of the fuel return valve 100 as previously discussed and is adjusted to a position producing an opening degree which corresponds to the temporarily increased turbine output speed. For some time after the fuel return valve 100 is closed, therefore, the flow rate of the fuel passed through the fuel flow control valve 70 to the fuel discharge passageway 54 is maintained at a relatively low value and maintains the revolution speed of the turbine output shaft 30 at a value approximating the desired revolution speed of the shaft 30 as will be seen from curve $C_1$ in FIG. 4C.

Because, furthermore, of the fact that the drop in magnitude of the signal Sf produced by the function generator 76 immediately after the fuel return valve 100 is made open is insufficient for producing an optimum decrement in the power output of the gas turbine 20 as previously discussed, the flow rate of the fuel through the fuel flow control valve 70 is not reduced to an appropriately low value by the point of time when the fuel return valve 100 is to be closed. When the fuel return valve 100 is closed, therefore, there is caused a sudden rise in the pressure of the fuel in the fuel discharge passageway 54 as indicated by curve $B_1$ in FIG. 3B. This causes an increase in the flow rate of the fuel to be supplied to the combustor 32 of the gas turbine 20 and results in a corresponding increase in the revolution speed of the turbine output speed 30. After the fuel return valve 100 is closed, therefore, the output shaft 30 of the gas turbine 20 and accordingly the input shaft of the power generator 42 tend to overrun the desired revolution speeds of the shafts and produce fluctuations in the frequency of the electric current to be produced by the power generator 42. The present invention contemplates elimination of these problems by modifying the output signal of the integrator 86 in the function generator 76 when there is caused a sudden change in the amount of load on the gas turbine 20.

To achieve this end, the control circuit provided in the arrangement illustrated in FIG. 1 further comprises an integrator output modifier 106 connected between the function generator 76 and the load-change detecting circuit 104. The circuit arrangement including the integrator output modifier 106, the load-change detecting circuit 104 and the integrator 86 forming part of the function generator 76 thus arranged is illustrated in some detail in FIG. 5.

Figure 5:
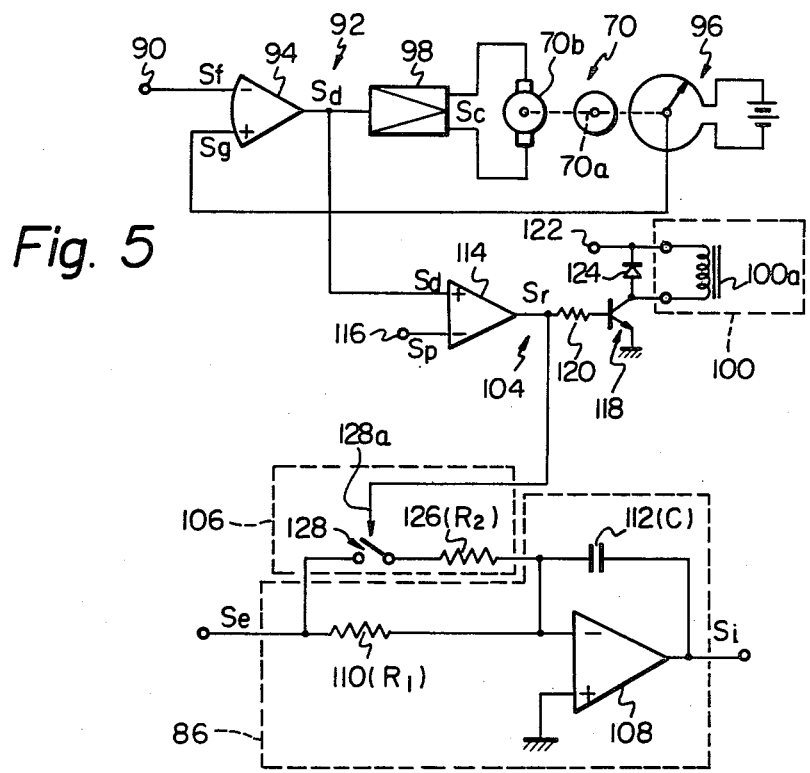
FIG. 5 is a schematic view showing a circuit arrangement forming part of the turbine output control system shown in FIG. 1.

Referring to FIG. 5, the integrator 86 incorporated in the function generator 76 is shown comprising an operational amplifier 108 having two input terminals one of which is grounded and the other of which is connected through a resistor 110 to the input terminal of the subtractor 80 forming part of the function generator 76 (FIG. 2). Across the operational amplifier 108 is provided a feedback capacitor 112 having an electrode connected to the output terminal of the operational amplifier and the other electrode connected to a junction or node between the operational amplifier 108 and the above-mentioned resistor 110. The output terminal of the operational amplifier 108 is further connected to the input terminal of the adder 88 also incorporated in the function generator 76. The resistor 110 and the capacitor 112 thus forming part of the integrator 86 are assumed to have a resistance $R_1$ and a capacitance C, respectively, and constitute in combination a time-constant circuit producing a predetermined time constant which is given by $R_1 \cdot C$.

On the other hand, the load-change detecting circuit 104 is shown in FIG. 5 as comprising a comparator 114 having two input terminals one of which is connected to the output terminal of the differential amplifier 94 of the previously described valve actuator 92 and the other of which is connected to a suitable signal source 116 adapted to constantly deliver a reference signal Sp representative of a predetermined difference in magnitude between the two input signals Sf and Sg to the differential amplifier 94 of the valve actuator 92. The comparator 114 of the load-change detecting circuit 104 is thus adapted to produce the previously mentioned output signal Sr of the detecting circuit 104 when the signal Sd delivered from the differential amplifier 94 of the valve actuator 92 and thus representative of the difference between the input signals Sf and Sq fed to the differential amplifier 94 is higher in magnitude than the reference signal Sp constantly delivered from the above-mentioned signal source 116 to the comparator 114 of the load-change detecting circuit 104. The output signal Sr from the comparator 114 is passed to the solenoid coil 110a of the solenoid-operated fuel return valve 100 through the base and collector of a transistor 118 serving as switching means for the solenoid coil 110a. The transistor 118 is shown to be of the n-p-n type and has its base connected via a resistor 120 to the output terminal of the differential amplifier 114 and its collector connected to a positive constant voltage source 122 through a parallel combination of the solenoid coil 100a of the fuel return valve 100 and a diode 124 which is directed to have its anode terminal connected to the collector of the transistor 118 and its cathode terminal connected to the constant voltage source 122 as shown. The emitter of the transistor 118 is grounded.

The integrator output modifier 106 connected between the integrator 86 and load-change detecting circuit 104 thus constructed and arranged comprises a series combination of a resitor 126 and a normally-open swtiching unit 128 which are connected in shunt across the resistor 110 forming part of the integrator 86 as shown. The switching unit 128 has a control element 128a connected to the output terminal of the compressor 114 of the load-change detecting circuit 104 so that the switching unit 128 is closed when the comparator 114 is delivering its output signal Sr. The switching unit 128 may be comprised of a relay having the control element 128a constituted by a relay coil or of a transistor having the control element 128a constituted by the base of the transistor, though not shown in the drawings. The resistor 126 provided as an impedance element in the output modifier 106 is assumed to have a resistance $R_2$.

Figure 6:
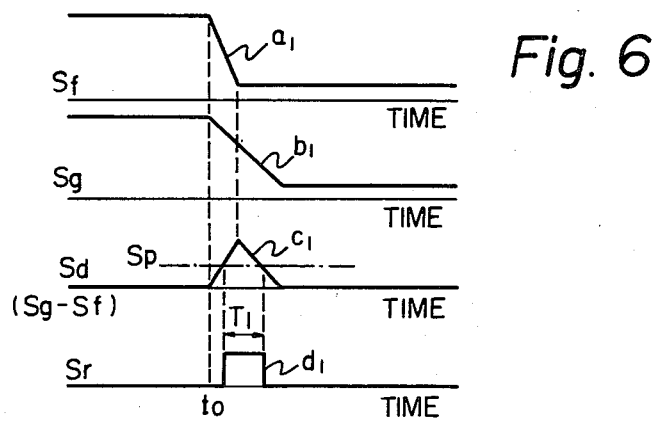
FIG. 6 is a graph showing the waveforms of some electric signals produced in the function generating circuit shown in FIG. 2 and the circuit arrangement illustrated in FIG. 5.

Upon reduction in the amount of load on the gas turbine 20 (FIG. 1) at time $t_o$, the output signal Sf delivered from the function generator 76 drops in magnitude abruptly as previously discussed with reference to FIG. 4A and as schematically indicated by waveform $a_l$ in FIG. 6. In response to the signal Sf thus appearing at the output terminal 90 of the function generator 76, the differential amplifier 94 serving as comparing or subtracting means in the valve actuator 92 produces its output signal Sd representative of the difference in magnitude between the two input signals Sf and Sg fed to the differential amplifier 94. The output signal Sd from the differential amplifier 94 is fed to the driver circuit 98 and is supplied as the previously mentioned control signal Sc from the driver circuit 98 to the servo motor 70b of the fuel flow control valve 70. The movable valve element 70a of the fuel flow control valve 70 is moved a distance or an angle corresponding to the magnitude of the control signal Sc and in a direction dictated by the polarity of the signal Sc supplied to the servo motor 70b, producing reduction in the opening degree of the movable valve element 70a and accordingly in the flow rate of fuel through the valve 70. As the opening degree of the valve element 70a of the fuel flow control valve 70 is thus reduced, the signal Sg produced by the potentiometer 96 responsive to the variation in the opening degree of the valve 70 is reduced in magnitude as indicated by waveform $b_l$ in FIG. 6 until the signal Sg supplied to one input terminal of the differential amplifier 94 of the valve actuator 92 is equalized in magnitude with the signal Sf supplied to the other input terminal of the differential amplifier 94. By reason of the delayed response of the servo motor 70b of the fuel flow control valve 70 to the signal Sf supplied thereto and possibly further because of the delay involved in the signal Sg fed back from the potentiometer 96 to the differential amplifier 94, the rate of change (or reduction in this instance) in the magnitude of the signal Sg representative of the detected opening degree of the fuel flow control 70 is less than the rate of change (or reduction) in the magnitude of the signal Sf representative of the desired opening degree of the valve 70 as will be understood upon comparison between the waveforms $a_1$ and $b_1$ in FIG. 6. For this reason, the signal Sg representative of the detected opening degree of the fuel flow control valve 70 remains higher in magnitude than the signal Sf representative of the desired opening degree of the valve 70 throughout the time duration for which the signal Sf is changing. It therefore follows that the signal Sd produced by the differential amplifier 94 of the valve actuator 92 and thus representative of the difference in magnitude between the signals Sf and Sg shows a tendency to increase in response to the reduction in magnitude of the signal Sf and reaches a peak value when the change in the signal Sf ceases, as will be seen from waveform $c_l$ in FIG. 6. After the point of time at which the signal Sd is increased to the peak value, the signal Sd declines at a rate equal to the rate of change in magnitude of the signal Sg until the signal Sg ceases to change or decrease with the movable valve element 70a of the fuel flow control valve 70 moved to a position producing a valve opening degree conforming to the signal Sf representative of the desired opening degree of the valve 70. The signal Sd delivered from the differential amplifier 94 of the valve actuator 92 and having the waveform $c_1$ shown in FIG. 6 is fed not only to the driver circuit 98 of the valve actuator 92 but to one input terminal of the comparator 114 of the load-change detecting circuit 104 for being compared with the predetermined value represented by the reference signal Sp constantly supplied to the other input terminal of the comparator 114. The comparator 114 is operative to produce its output signal Sr during a period of time $T_1$ for which the signal Sd representative of the difference between the detected and desired opening degrees of the fuel flow control valve 70 is higher in magnitude than the signal Sp representative of the predetermined value of such a difference, as will be seen from waveform $d_1$ in FIG. 6. The signal Sr thus delivered in the form of a pulse from the comparator 114 is fed through the resistor 120 to the base of the transistor 118 and makes the transistor conductive, establishing a closed circuit between the power source 122 and ground through the solenoid coil 100a of the fuel return valve 100. The fuel return valve 100 is now actuated to open and allows the fuel in the fuel supply circuit 56 (FIG. 1) to partially return to the fuel storage tank 58 for a period of time corresponding to the duration $T_1$ of the pulse delivered from the comparator 114.

The output signal Sr from the comparator 114 of the load-change detecting circuit 104 is supplied not only to the transistor 116 but to the control element 128a of the switching unit 128 incorporated in the integrator output modifier 106 connected to the integrator 108 of the function generator 76 (FIG. 2) and causes the switching unit 128 to close. The capacitor 112 of the integrator 86 is now connected to the parallel combination of the resistor 110 forming part of the integrator 86 and the resistor 126 forming part of the integrator output modifier 106 with the result that the time constant effective for the integrator 86 is altered from $R_1 \cdot C$ to a smaller value which is represented by $(R_1 \cdot R_2/R_1 + R_2) \cdot C$.

In consequence of the reduction in the time constant effective for the integrator 86, the response of the integrator 86 to the input signal Se is accelerated so that the integrator 86 is enabled to respond earlier to variation in the magnitude of the error signal Se. The signal Sf delivered from the function generator 76 after reduction in the amount of load on the gas turbine 20 is therefore reduced to the level corresponding to the desired opening degree of the fuel flow control valve 70 as will be seen from curve $A_2$ shown in FIG. 4A with the result that the pressure of the fuel in the fuel discharge passageway 54 shown in FIG. 1 becomes stable soon after the fuel pressure is abruptly reduced upon opening of the fuel return valve 100. There being no temporary rise or other fluctuation in the pressure of the fuel to be injected into the combustor 32 of the gas turbine 20 as will be seen from curve $B_2$ in FIG. 4B, the power output and accordingly the output revolution speed of the gas turbine 20 are made substantially constant soon after the power output of the gas turbine has been temporarily augmented in response to the reduction in the amount of load on the gas turbine, as will be seen from curve $C_2$ in FIG. 4C. Upon lapse of the time $T_1$ after the signal Sr has been delivered from the comparator 114 of the load-change detecting circuit 104, the solenoid coil 100a of the fuel return valve 100 and the control element 128a of the switching unit 128 forming part of the integrator output modifier 106 are de-energized concurrently. The fuel return valve 100 is now closed and cuts off the flow of fuel through the fuel return passageway 62' and at the same time the switching unit 128 of the load-change detecting circuit 106 is made open so that the resistor 126 is electrically disconnected from the integrator 86 and as a consequence the time constant effective in the integrator 86 is increased to the initial level of $R_1 \cdot C$. Under these conditions, the signal Sf supplied from the function generator 76 and the pressure of the fuel in the fuel discharge passageway 54 are sufficiently stabilized as will be seen from the curves $A_2$ and $B_2$ in FIGS. 4A and 4B, respectively, so that the flow rate of the fuel through the fuel flow control valve 70 and accordingly the revolution speed of the gas turbine output shaft 30 are made substantially constant as will be seen from the curve $C_2$ in FIG. 4C and enable the power generator 42 to produce an electric current with the prescribed rated frequency.

Figure 7:
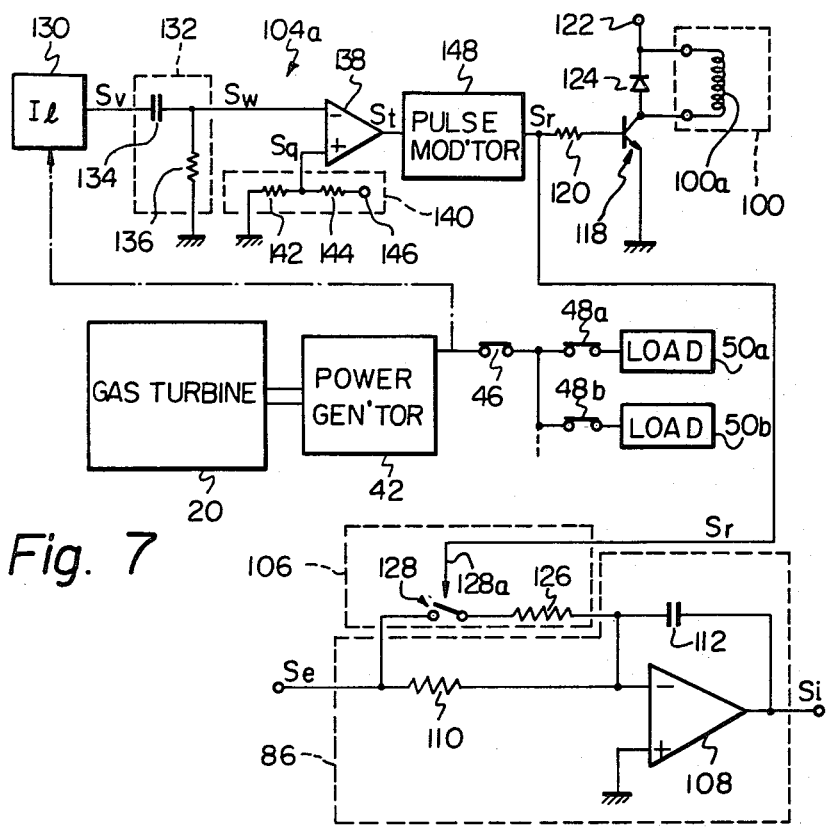
FIG. 7 is a schematic view showing a modification of the circuit arrangement of FIG. 5.

FIG. 7 shows a modification of the circuit arrangement hereinbefore described with reference to FIG. 5. In the circuit illustrated in FIG. 7, the load-change detecting circuit, now designated in its entirety by 104a, is arranged to be responsive to the variation in the output current from the power generator 42 driven by the gas turbine 20. The output current from the power generator 42 is detected by a load current detector 130 having an input terminal connected to the output terminal of the power generator 42 and is operative to produce an analog output signal Sv proportional or otherwise continuously variable with the load current Il to be supplied from the power generator 42. Such a detector 130 may be constituted, by way of example, by a currentsensing resistor (not shown) connected between the output terminal of the power generator 42 and the load circuit for producing a voltage proportional to the current to flow through the resistor.

The load-change detecting circuit 104a in the arrangement shown in FIG. 7 comprises a differentiator 132 which has an input terminal connected to the output terminal of the above described load current detector 130 and which is operative to produce an analog output signal Sw proportional in magnitude to the time derivative of the input signal Sv supplied from the load current detector 130. The output signal Sw of the differentiator 132 in thus representative of the rate of change in the output current from the power generator 42 and accordingly in the amount of load on the gas turbine 20. The differentiator 132 is shown, by way of example, as being constituted by an RC network consisting of a capacitor 134 connected between the input and output terminals of the differentiator and a resistor 136 connected between ground and the output terminal of the differentiator. The output signal Sw from the differentiator 132 is supplied to a comparator 138 having two input terminals one of which is connected to the output terminal of the differentiator 132 and the other of which is connected to a reference signal generator 140 which is adapted to constantly supply the comparator 138 with a reference signal S8 representative of a predetermined rate of decrease in the load current to be supplied to the power generator 42. The reference signal generator 140 is shown, by way of example, to be constituted by a voltage divider having resistors 142 and 144 connected between ground and a suitable constant voltage source 146 and having therebetween a node or junction point connected to the comparator 138. The comparator 138 is thus operative to compare the analog signal Sw from the differentiator 132 with the fixed reference signal Sq and produce therefrom a trigger signal St in the form of a positive pulse when the analog signal Sw is greater in magnitude than the fixed reference signal Sq. The trigger signal St thus delivered from the comparator 138 is fed to a pulse modulator 148 adapted to produce a positive pulse having a predetermined pulsewidth $T_2$ upon receipt of the trigger signal St from the comparator 138. The pulse thus produced by the pulse modulator 148 is fed as the output signal Sr of the load-change detecting circuit 104a to the base of the transistor 118 serving as the switching means for the coil 100a of the fuel return valve 100 and to the integrator output modifier 106. The integrating ratio modifier 106 per se is constructed and arranged similarly to its counterpart in the circuit arrangement shown in FIG. 5 and is thus composed of the series combination of the resistor 126 and normally-open switching unit 128 which are connected in shunt across the resistor 110 in the integrator 86 forming part of the function generator 76 (FIG. 2). The switching unit 128 is adapted to close when its control element 128a connected to the output terminal of the above described pulse modulator 148 is being energized with the pulse signal Sr produced by the pulse modulator 148.

Figure 8:
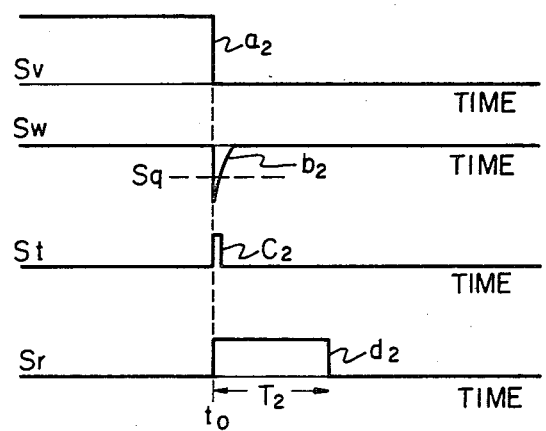
FIG. 8 is a graph showing the waveforms of some electric signals produced in the circuit arrangement illustrated in FIG. 7.

When, now, there is caused a sudden decrease in the amount of load on the gas turbine 20 which is in operation for driving the power generator 42, the load current Il detected by the load current detector 130 diminishes abruptly with the result that the signal Sv being supplied from the load current detector 130 to the differentiator 132 of the load-change detecting circuit 104a drops in magnitude abruptly at time $t_o$ as indicated by waveform $a_2$ in FIG. 8. It therefore follows that the output signal Sw from the differentiator 132 drops for a moment after the time $t_o$ as will be seen from curve $b_2$ shown in FIG. 8. When the signal Sw supplied to one input terminal of the comparator 138 exceeds in magnitude the predetermined value represented by the fixed reference signal Sq supplied to the other input terminal of the comparator 138, the comparator 138 delivers an output signal St in the form of a pulse as indicated by waveform $c_2$ in FIG. 8. The pulse signal St thus produced at the output terminal of the comparator 138 is supplied as a trigger signal to the pulse modifier 148 and actuates the pulse modulator 148 to produce an output signal in the form of a pulse having a predetermined pulsewidth $T_2$ as indicated by waveform $d_2$ in FIG. 8. The pulse signal is passed as the output signal Sr of the load-change detecting circuit 104 to the base of the transistor 118 and the integrator output modifier 106. The transistor 116 having its thus energized by the pulse signal Sr is made conductive and permits the coil 100a of the solenoid-operated fuel return valve 100 to be energized from the power source 122 for a period of time corresponding to the time duration $T_2$ of the pulse signal Sr impressed on the transistor 118. The pulse signal Sr passed to the integrator output modifier 106 is fed to the control element 128a of the switching 128 and maintains the switching unit 128 closed for a period of time also corresponding to the time duration of the pulse signal Sr, thereby producing similar effects to those obtained in the circuit arrangement of FIG. 5 for the period of time when the fuel return valve 100 is kept open.

Figure 9:
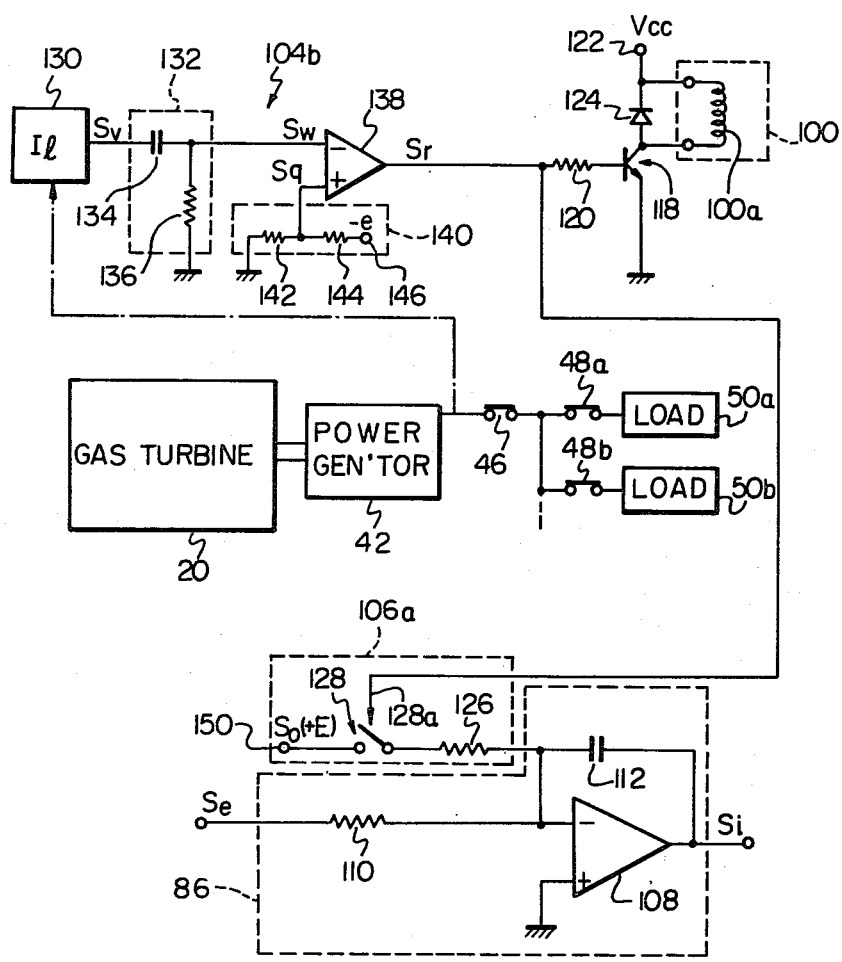
FIG. 9 is a schematic view showing another modification of the circuit arrangement illustrated in FIG. 7.
Figures 10A, 10B, 10C, 10D:
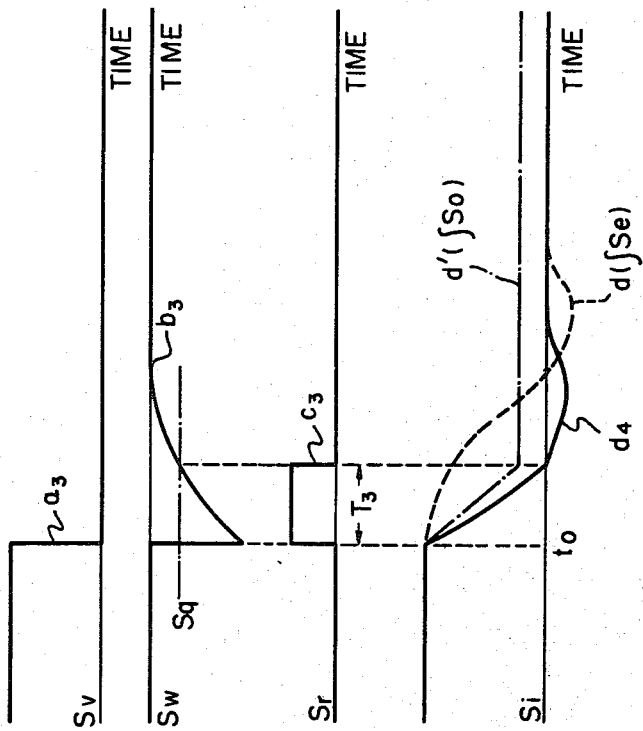
FIGS. 10A to 10D are graphs showing the waveforms of some electric signals produced in the circuit arrangement illustrated in FIG. 9.

FIG. 9 shows a modification of the circuit arrangement hereinbefore described with reference to FIG. 7. In the arrangement shown in FIG. 9, the load-change detecting circuit, designated in this instance by 104b, comprises a differentiator 132 connected to the output terminal of the load current detector 130, and a comparator 138 having two input terminals one of which is connected to the output terminal of the differentiator 132 and the other of which is connected to a reference signal generator 140 adapted to constantly supply the comparator 138 with a fixed reference signal Sq representative of a predetermined value of the rate of decrease in the load current Il delivered from the power generator 42 which is driven by the gas turbine 20, similarly to the load-change detecting circuit 104a in the arrangement of FIG. 7. The load-change detecting circuit 104b in the arrangement illustrated in FIG. 9, however, devoid of the pulse modulator 148 provided in the load-change detecting circuit 104a in the arrangement of FIG. 7 so that the output signal from the comparator 138 is fed directly as the output signal Sr of the load-change detecting circuit 104b to the base of the transistor 118 serving as the switching means for the coil 110a of the fuel return valve 100 and to the control element 128a of the integrator output modifier which in the arrangement of FIG. 9 is designated by 106a. When, therefore, the load-current detector 130 and the differentiator 132 are delivering their respective output signals Sv and Sw upon sudden reduction in the load current Il at time $t_o$ as indicated by waveforms $a_3$ and $b_3$, respectively, in FIGS. 10A and 10B, the control element 128a of the switching unit 128 as well as the transistor 118 connected to the coil 100a of the fuel return valve 100 is supplied with a positive pulse having a pulsewidth $T_3$ which is variable with the time duration for which the signal Sw applied to one input terminal of the comparator 138 is greater in magnitude than the fixed reference signal Sq applied to the outer input terminal of the comparator 138, as will be seen from waveforms $b_3$ and $c_3$ shown in FIGS. 10B and 10C, respectively, the time duration $T_3$ for which the fuel return valve 100 is to be kept open after time $t_o$ is, thus, variable not only with the rate of change in the load current Il to be supplied from the power generator 42 but with the value represented by the fixed reference signal Sq to be supplied to the comparator 138.

The integrator output modifier 106a incorporated in the circuit arrangement illustrated in FIG. 9 is constructed similarly to its counterparts in the circuit arrangements of FIGS. 5 and 7 and which is thus composed of a series combination of a resistor 126 and the above-mentioned switching unit 128. While, however, the integrator output modifier 106 provided in each of the circuit arrangements shown in FIGS. 5 and 7 is connected in shunt across the resistor 110 in the integrator 86 forming part of the function generator 76 (FIG. 2), the integrator output modifier 106a incorporated in the circuit arrangement of FIG. 9 is connected between a suitable bias signal generator 150 and the node between the resistor 110 and capacitor 112 of the integrator 86. The bias signal generator 150 may be constituted by a constant voltage source at which a predetermined positive potential $E_o$ is established so that, when the switching unit 128 is closed in response to the pulse signal Sr supplied to the control element 128a thereof from the load-change detecting circuit 104b as described above, not only the analog signal Se supplied from the subtractor 80 of the function generator 76 (FIG. 2) but a fixed bias signal So are fed to the integrator 86 and causes the output signal Si of the integrator 86 to drop at a rate which is dictated in part by the analog Se (which increases abruptly in magnitude in response to the reduction in the amount of load on the gas turbine) supplied from the subtractor 80 in the function generator 76 and in part by the fixed bias signal So supplied from the integrating ratio modifier 106, as indicated by waveform $d_4$ in FIG. 10D. The output signal Si delivered from the integrator 86 is, thus, composed of a component resulting from the analog signal Se as indicated by waveform d and a component resulting from the fixed bias signal So as indicated by d' in FIG. 10D. Upon lapse of the time duration $T_3$ after time $t_o$, the pulse signal Sr from the load-change detecting circuit 104b disappears, causing or allowing the fuel return valve 100 to close and the switching unit 128 of the integrator output modifier 106a to open. At the point of time when the integrator output modifier 106a is thus electrically disconnected from the integrator 86, the output signal Si of the integrator 86 is reduced to a level substantially corresponding to the desired opening degree of the fuel flow control valve 70 (FIG. 1) as will be seen from the waveform $d_4$ in FIG. 10D and is practically free from a retarded response which would otherwise be involved in the signal Si if the integrator 86 is allowed to produce an output signal varying in magnitude as indicated by the waveform d in FIG. 10D. After the fuel return valve 100 is closed, therefore, the flow rate of the fuel to be passed through the fuel return valve 70 is regulated by the signal Sf which is maintained substantially constant at a level optimum for enabling the gas turbine to produce a desired power output as will be seen from the curves $A_2$ and $C_2$ shown in FIGS. 4A and 4C, respectively.

Figure 11:
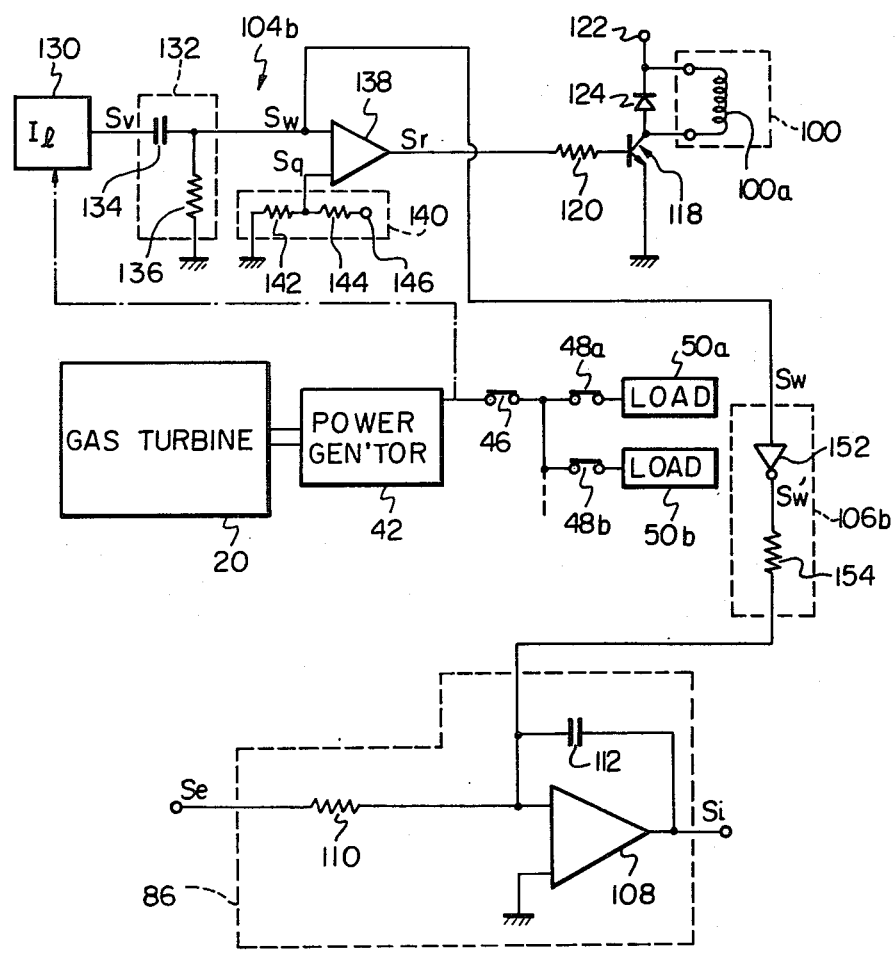
FIG. 11 is a schematic view showing a modification of the circuit arrangement illustrated in FIG. 9.

FIG. 11 shows a modification of the circuit arrangement hereinbefore described with reference to FIG. 9. While the integrator output modifier 106a incorporated in the circuit arrangement of FIG. 9 is operative to supply the integrator 86 with a signal having a fixed magnitude, the circuit arrangement illustrated in FIG. 11 is characterized by an integrator output modifier 106b which is adapted to modify the output signal of the integrator 86 by applying to the integrator 86 an input which is continuously variable with the output signal Sw from the differentiator 132 in the load-change detecting circuit 104b which per se is constructed and arranged similarly to its counterpart in the circuit arrangement of FIG. 9. The integrator output modifier 106b provided in the circuit arrangement of FIG. 11 comprises a signal inverter 152 having an input terminal connected to the output terminal of the differentiator 132 of the load-change detecting circuit 104b for producing at its output terminal an analog signal Sw' which is equal in magnitude and opposite in polarity to the output signal Sw from the differentiator 132. The signal Sw' thus appearing at the output terminal of the signal inverter 152 is passed to the integrator 86 of the function generator 76 (FIG. 2) through a resistor 154 which is connected to the node between the resistor 110 and capacitor 112 of the integrator 86.

Figures 12A, 12B, 12C, 12D, 12E:
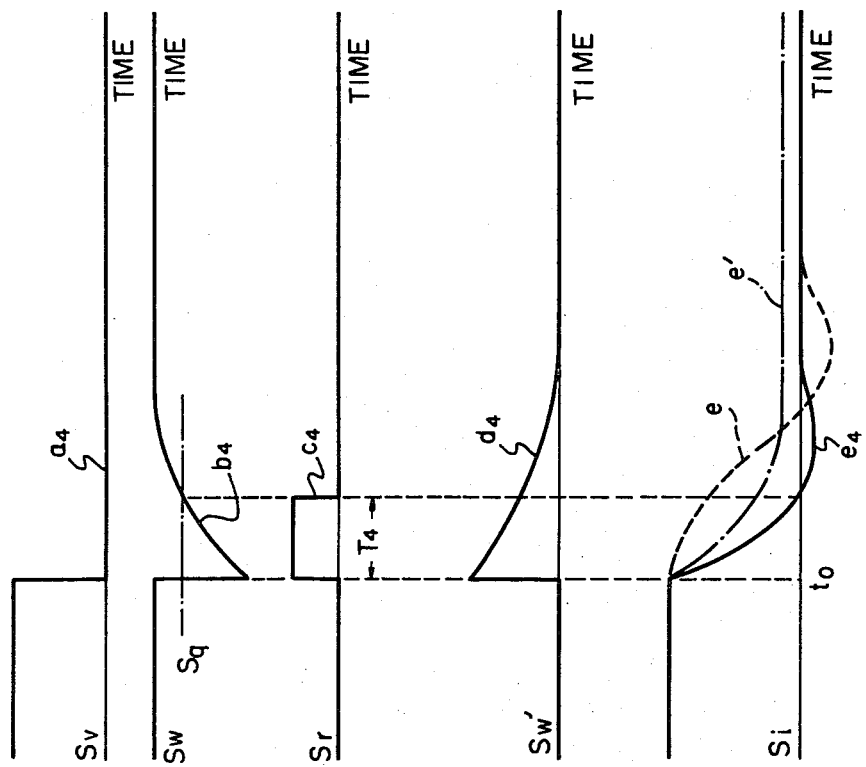
FIGS. 12A to 12E are graphs showing the waveforms of some electric signals produced in the circuit arrangement illustrated in FIG. 11.

When, now, there is caused an abrupt decrease in the amount of load on the gas turbine 20 at time $t_o$ during operation of the gas turbine and as a consequence the output signal Sv from the load current detector 130 drops abruptly as indicated by waveform $a_4$ in FIG. 12A, the signals Sw and Sr delivered from the differentiator 132 and the comparator 138, respectively, of the load-change detecting circuit 104b vary as indicated by waveforms b4 and c4 in FIGS. 12B and 12C, respectively. The pulse signal Sr appearing at the output terminal is delivered to the transistor 118 and permits the coil 100a of the solenoid-operated fuel return valve 100 to be energized from the positive constant-voltage source 122, causing the fuel return valve 100 to open. The signal Sw delivered from the differentiator 132 is fed not only to the comparator 138 but to the signal inverter 154 of the integrator output modifier 106b and is converted into the above described signal Sw' which rises instantaneously at time $t_o$ and thereafter drops progressively as indicated by waveform $d_4$ in FIG. 12D. The output signal Sw' from the signal inverter 154 is applied through the resistor 156 to the integrator 86 of the function generator 76 (FIG. 2) and causes the integrator 86 to produce an output signal Si which varies as indicated by waveform $d_4$ in FIG. 12E, producing in the integrator 86 effects similar to those obtained in the integrator 86 in the arrangement of FIG. 9. The signal Si delivered from the integrator 86 in the arrangement of FIG. 11 is composed of a component resulting from the analog signal Se as indicated by waveform e and a component resulting from the above-mentioned output signal Sw' as indicated by waveform e' in FIG. 12E.

From the foregoing description it will have been understood that, while the integrator output modifier 106 in each of the circuit arrangements illustrated in FIGS. 5 and 7 is adapted to increase the rate of change in the magnitude of the output signal of the integrator 86 by reducing the time constant effective for the integrator 86 throughout the period of time for which the fuel return valve 100 is open, each of the integrator output modifiers 106a and 106b respectively provided in the circuit arrangements illustrated in FIGS. 9 and 11 is adapted to achieve a similar effect by superposing a fixed or variable additional signal So or Sw' on the normal input signal Se for the integrator 86 throughout the period of time when the fuel return valve 100 is open.

Figure 13:
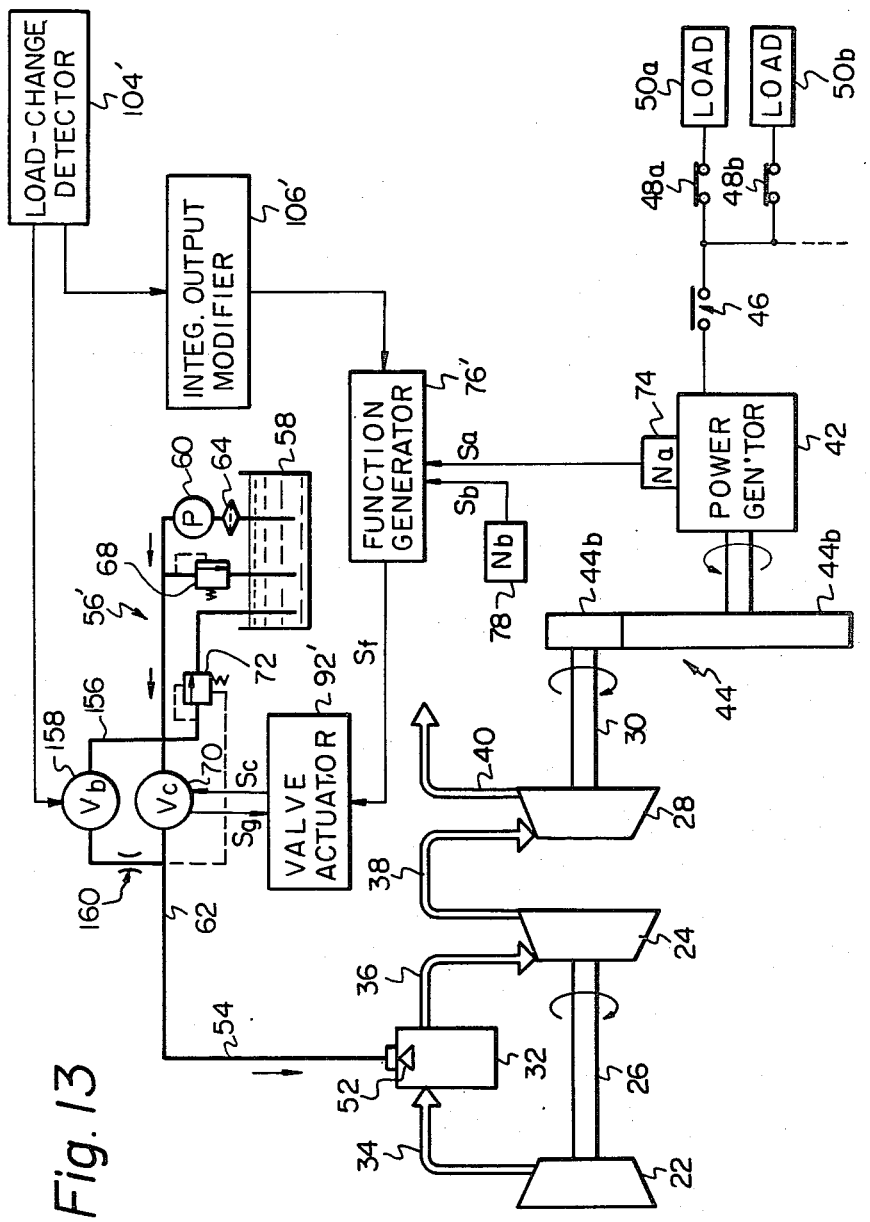
FIG. 13 is a view similar to FIG. 1 but shows another preferred embodiment of the turbine control system according to the present invention.

The present invention has been described as being applied to a control system responsive to an abrupt decrease in the amount of load on the gas turbine. It will be, however, readily understood that each of the circuit arrangements hereinbefore described with reference to FIGS. 5, 7, 9 and 11 may be applied, either without change or upon minor modification, to a turbine output control system responsive to a sudden increase in the amount of load on the gas turbine. FIG. 13 shows an embodiment of a control system of this nature.

Referring to FIG. 13, such a turbine output control system is shown to be applied to a gas turbine 20 constructed and arranged in combination with a power generator 42 similarly to the gas turbine and power generator system illustrated in FIG. 1. Thus, the turbine output control system shown in FIG. 13 comprises a fuel supply circuit 56' including a fuel discharge passageway 54 terminating in the fuel injection valve 52 open into the combustor 32 of the gas turbine 20, a fuel feed passageway 62 providing communication between the fuel discharge passageway 54 and a fuel storage tank 58 through a fuel feed pump 60 and a fuel strainer 64, a pressure relief valve 68 provided in the fuel feed passageway 62 upstream of the fuel flow control valve 70, and a differential pressure compensating valve 72 provided across the fuel flow control valve 70.

The fuel supply circuit 56' in the turbine output control system shown in FIG. 13 further comprises a by-pass passageway 156 connected to shunt across the fuel flow control valve 70 and provided with a solenoid-operated two-position bypass valve 158. The bypass valve 158 is biased to close by suitable means incorporated therein and is actuated to open when electrically energized. The bypass passageway 156 is further arranged with a flow restriction or orifice 160 which is adapted to maintain the flow rate of the fuel through the bypass passageway 156 below a predetermined value when the bypass valve 158 is open.

Figure 14:
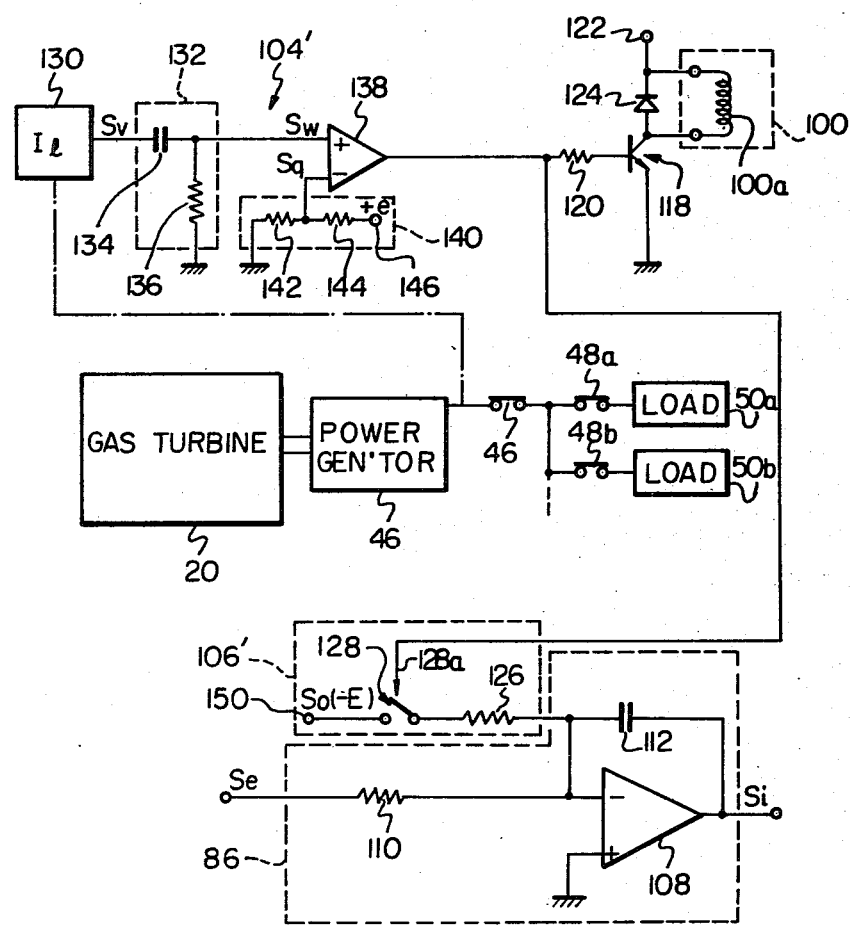
FIG. 14 is a schematic view showing a circuit arrangement forming part of the turbine control system illustrated in FIG. 13.

The control circuit for controlling the fuel flow control valve 70 and the bypass valve 158 which are thus arranged in parallel in the fuel supply circuit 56' is constructed essentially similarly to the control circuit illustrated in FIG. 1 and thus comprises a load-change detecting circuit 104', an integrator output modifier 106', a function generator 76' and a valve actuator 92'. The function generator 76' and the valve actuator 92' are constructed and arranged entirely similarly to the function generator 76 and the valve actuator 92 shown in FIGS. 2 and 3, respectively. The load-change detecting circuit 104' and the integrator output modifier 106' may be constructed similarly in combination to their respective counterparts in the circuit arrangement of FIG. 5, 7, 9 or 11. FIG. 14 illustrates a circuit arrangement in which the load-change detecting circuit 104' and integrator output modifier 106' of the control circuit shown in FIG. 13 are constructed similarly to the load-change detecting circuit 104b and integrator output modifier 106a, respectively, in the circuit arrangement of FIG. 9. The only difference of the circuit arrangement of FIG. 14 from that shown in FIG. 9 is that the reference signal Sr to be built up at the reference signal input terminal of the comparator 138 forming part of the load-change detecting circuit 104' and the bias signal So to be delivered from the bias signal generator 150 of the integrator output modifier 106' in the circuit arrangement of FIG. 14 are opposite in polarity to their respective counterparts in the arrangement of FIG. 9.

The present invention has been hereinbefore described as being applied to a gas turbine utilized as a driving source for an electric power generator but it will be apparent that a turbine output control system according to the present invention is applicable to any of the gas turbines used as prime movers in power-driven ships, aircrafts and land vehicles or for any industrial purposes. Thus, an abrupt increase or decrease in the amount of load on the gas turbine provided with a control system according to the present invention may be detected from a change in the input or output of any means driven by the gas turbine. If the power output of the gas turbine is to be delivered to a load by way of a clutch of any type, the occurrence of a sudden increase or decrease in the amount of load on the gas turbine may be detected from an engaged or disengaged condition of the clutch.

What is claimed is:

1. An output control system for a gas turbine having a fuel combustor and a fuel supply circuit for the fuel combustor, comprising a fuel flow control valve provided in said fuel supply circuit and operable for continuously varying the flow rate of fuel therethrough; turbine output detecting means responsive to the variation in the output speed of the gas turbine for producing an output signal variable with the detected turbine output speed; turbine output preset means for producing a signal representative of a desired output speed of the gas turbine; a function generating circuit connected to said turbine output detecting means and said turbine output preset means and including a subtractor operative to produce an analog signal which is continuously variable in magnitude with the difference between the detected and desired turbine output speeds represented respectively by the signal from the turbine output detecting and preset means, and an integrator connected to said subtractor and operative to produce an analog output signal representative of the time integral of said difference represented by the output signal from said subtractor, said function generator circuit being operative to produce an analog output signal continuously variable in magnitude with the output signal from said integrator; valve actuating means electrically connected between said function generating circuit and said fuel flow control valve for continuously varying the opening degree of the fuel flow control valve in accordance with the analog output signal from the function generating circuit; load-change detecting means responsive to the variation in the amount of load on the gas turbine and operative to produce an output signal having a limited time duration in response to an abrupt change in the amount of load on the gas turbine; and integrator output modifying means connected between said load-change detecting means and the integrator of said function generating circuit and operative to modify the output signal of the integrator to vary at an increased rate at least for a period of time corresponding to the duration of the output signal from said load-change detecting means.

2. An output control system as set forth in claim 1, further comprising open-degree detecting means for detecting the opening degree of said fuel flow control valve and producing an analog output signal which is continuously variable in magnitude with the detected valve opening degree, therein said valve actuating means is responsive to the output signal from said function generating circuit and the output signal from said open-degree detecting means for producing an analog signal which is continuously variable in magnitude with the difference in magnitude between the respective output signals from the function generating circuit and the open-degree detecting means, the valve actuating means being constantly operative to actuate said fuel flow control valve for continuously varying the opening degree of the valve so that the output signal from the open-degree detecting means constantly converges in magnitude toward the output signal from the function generating circuit.

3. An output control system as set forth in claim 2, in which said load-change detecting means comprises a comparator having an input terminal connected to said valve actuating means for being supplied with said signal produced by the valve actuating means and an input terminal connected to a reference signal generator for constantly delivering a reference signal representative of a predetermined value, the load-change detecting means being operative to produce the output signal thereof as being representative of an abrupt change in the amount of load on the gas turbine when the signal from said valve actuating means is in a predetermined relationship in magnitude to said reference signal, said integrator output modifying means having an input terminal connected to said comparator and being operative to modify the output signal of said integrator in response to the output signal from said comparator.

4. An output control system as set forth in claim 1, in which said load-change detecting means comprises load detecting means for detecting the amount of load on the gas turbine and producing an analog output signal continuously variable in magnitude with the detected amount of load, a differentiator having an input terminal connected to said load detecting means and operative to produce an analog output signal representative of the time derivative of the detected amount of load represented by the output signal from the load detecting means, and a comparator having an input terminal connected to the output terminal of said differentiator and an input terminal connected to a reference signal generator for constantly delivering a reference signal representative of a predetermined rate of change of the amount of load on the gas turbine, said comparator being operative to produce an output signal as being representative of an abrupt change in the amount of load on the gas turbine when the signal delivered from said differentiator to said comparator is in a predetermined relationship in magnitude to said reference signal.

5. An output control system as set forth in claim 4, in which said load-change detecting means further comprises pulse generating means connected between said comparator and said integrator output modifying means and operative to produce a pulse having a predetermined time duration as said output signal of the load-change detecting means in response to the output signal from said comparator.

6. An output control system as set forth in claim 4, in which said comparator of said load-change detecting means has an output terminal connected to said integrator output modifying means and is operative to produce the output signal thereof as said output signal of the load-change detecting means.

7. An output control system as set forth in any one of claims 1 to 6, in which said integrator of said function generating circuit comprises a time-constant circuit producing a predetermined time constant in the integrator and in which said integrator output modifying means comprises an impedance element connected to said time-constant circuit across a switching unit having a control element connected to said load-change detecting means, said switching unit being closed in the presence of the output signal of the load-change detecting means at said control element, said impedance element being arranged to produce in combination with said time-constant circuit of the integrator a time constant smaller than said predetermined time constant when said switching unit is closed.

8. An output control system as set forth in claim 7, in which said time-constant circuit consists of a combination of a resistor and capacitor and in which said impedance element consists of a resistor connected in shunt across said resistor of said time-constant circuit across said switching unit.

9. An output control system as set forth in any one of claims 1 to 6, in which said integrator output modifying means comprises a source of a bias signal having a predetermined magnitude and connected to said integrator across a switching unit having a control element connected to said load-change detecting means, said switching unit being closed in the presence of the output signal of the load-change detecting means at said control element for superposing said bias signal on said signal to be delivered to said integrator from said subtractor.

10. An output control system as set forth in claim 1, in which said load-change detecting means comprises load detecting means for detecting the amount of load on the gas turbine and producing an analog output signal continuously variable in magnitude with the detected amount of load, and a differentiator which has an input terminal connected to said load detecting means and which is operative to produce an analog output signal representative of the time derivative of the detected amount of load represented by the output signal from the load detecting means, wherein said integrator output modifying means comprises a signal inverter connected between said differentiator and said integrator and operative to invert the waveform of the output signal from the differentiator and deliver the resultant signal to said integrator for superposing said resultant output signal on the signal to be delivered to the integrator from said subtractor.

11. An output control system as set forth in any one of claims 1 to 6, further comprising a fuel return passageway connected to said fuel supply circuit and a two-position valve provided in said fuel return passageway and having open and closed conditions, said load-change detecting means having an output terminal electrically connected to said two-position valve for actuating the two-position valve to open in response to said output signal from the load-change detecting means and for a period of time corresponding to said time duration.

12. An output control system as set forth in claim 3, further comprising a fuel return passageway connected to said fuel supply circuit and a two-position valve provided in said fuel return passageway and having open and closed conditions, said comparator having an output terminal connected to said two-position valve for actuating the two-position valve to open in response to said output signal from the comparator and for a period of time corresponding to said time duration.

13. An output control system as set forth in claim 5, further comprising a fuel return passageway connected to said fuel supply circuit and a two-position valve provided in said fuel return passageway and having open and closed conditions, said means between said comparator and said integrator output detecting means having an output terminal connected to said two-position valve for actuating the two-position valve to open in response to said pulse and for a period of time corresponding to the time duration of said pulse.

14. An output control system as set forth in claim 6, further comprising a fuel return passageway connected to said fuel supply circuit and a two-position valve provided in said fuel return passageway and having open and closed conditions, said output terminal of said comparator being further connected to said two-position valve for actuating the two position valve in response to said output signal from the comparator for a period of time corresponding to said time duration.

15. An output control system as set forth in claim 7, further comprising a fuel return passageway connected to said fuel supply circuit and a two-position valve provided in said fuel return passageway and having open and closed conditions, said load-change detecting means having an output terminal connected to said two-position valve and said control element of said switching unit for actuating the two-position valve to open and concurrently the switching unit to close in the presence of the output signal of said load-change detecting means.

16. An output control system as set forth in claim 9, further comprising a fuel return passageway connected to said fuel supply circuit and a two-position valve provided in said fuel return passageway and having open and closed conditions, said load-change detecting means has an output terminal connected to said two-position valve and said control element of said switching unit for actuating the two-position valve to open and simultaneously said switching unit to close in the presence of the output signal of the load-change detecting means.

17. An output control system as set forth in claim 10, further comprising a fuel return passageway connected to said fuel supply circuit and a two-position valve provided in said fuel return passageway and having open and closed conditions, wherein said load-change detecting means further comprises a comparator having an input terminal connected to the output terminal of said differentiator, an input terminal connected to a reference signal generator for constantly delivering a reference signal representative of a pre-determined rate of change in the amount of load represented by the output signal from said load detecting means, and an output terminal connected to said two-position valve, said comparator being operative to produce an output signal when the output signal from said differentiator is in a pre-determined relationship in magnitude to said reference signal, the output signal from said comparator being fed as said output signal of said load-change detecting means to said two-position valve for actuating the two-position valve to open for a period of time corresponding to the time duration of the signal from said comparator.

* * * * *